United States Patent [19]

Stein

[11] Patent Number: 5,282,343
[45] Date of Patent: Feb. 1, 1994

[54] BUILDING STRUCTURES; ELEMENTS AND METHOD FOR CONSTRUCTING SAME

[76] Inventor: Alejandro Stein, Tronco Internationl 3080 Center St., Miami, Fla. 33133

[21] Appl. No.: 67,398

[22] Filed: May 24, 1993

Related U.S. Application Data

[63] Continuation of Ser. No. 612,580, Nov. 12, 1990, abandoned.

[30] Foreign Application Priority Data

Aug. 17, 1990 [IL] Israel ..................... 095411

[51] Int. Cl.$^5$ .............................................. E04B 2/00
[52] U.S. Cl. ........................................ 52/233; 52/284; 52/587; 52/726.2; 403/382; 446/106
[58] Field of Search ................. 52/233, 270, 726.1, 52/726.2, 582, 586, 588, 587, 127.6, 127.7, 127.9, 284; 403/326, 345–347, 382; 446/106, 126; 312/111, 140

[56] References Cited

U.S. PATENT DOCUMENTS

| | | | |
|---|---|---|---|
| 378,769 | 2/1888 | Coas | 138/154 |
| 2,635,303 | 4/1953 | Poynter | 52/233 |
| 2,644,475 | 7/1953 | Norton | 403/326 |
| 2,874,512 | 2/1959 | Joseph et al. | 446/106 |
| 2,946,150 | 7/1960 | Houk | 446/106 |
| 4,170,082 | 10/1979 | Freedman | 446/126 X |
| 4,619,089 | 10/1986 | Stein | 52/233 |
| 4,823,528 | 4/1989 | Faw | 52/233 |

*Primary Examiner*—Michael Safavi
*Assistant Examiner*—Robert Canfield
*Attorney, Agent, or Firm*—Cooper & Dumham

[57] ABSTRACT

A tubular wall member useful for the erection of building structures comprises an end connector inserted into the open ends of a hollow tubular member. The end connector provides a flat, substantially circular front end portion and a rearward extending body portion comprising two spaced, matchingly notched, parallel plates. Tabs rearwardly extending from the periphery of the circular front end of the connector are provided with the rear end portion thereof bent upwardly and forward so that when the front of the end connector is inserted into the open end of the tubular member, the bent tabs contact the end of the tubular member. The height of the spaced parallel plates is greater than the opening of the tubular member such that when the end connectors are assembled with the tubular members by insertion thereinto and placed one upon each other, with the notch of one end connector fitted into the notch of another end connector, a spacer or gap is provided along the length of the superjacent assembled tubular members.

4 Claims, 4 Drawing Sheets

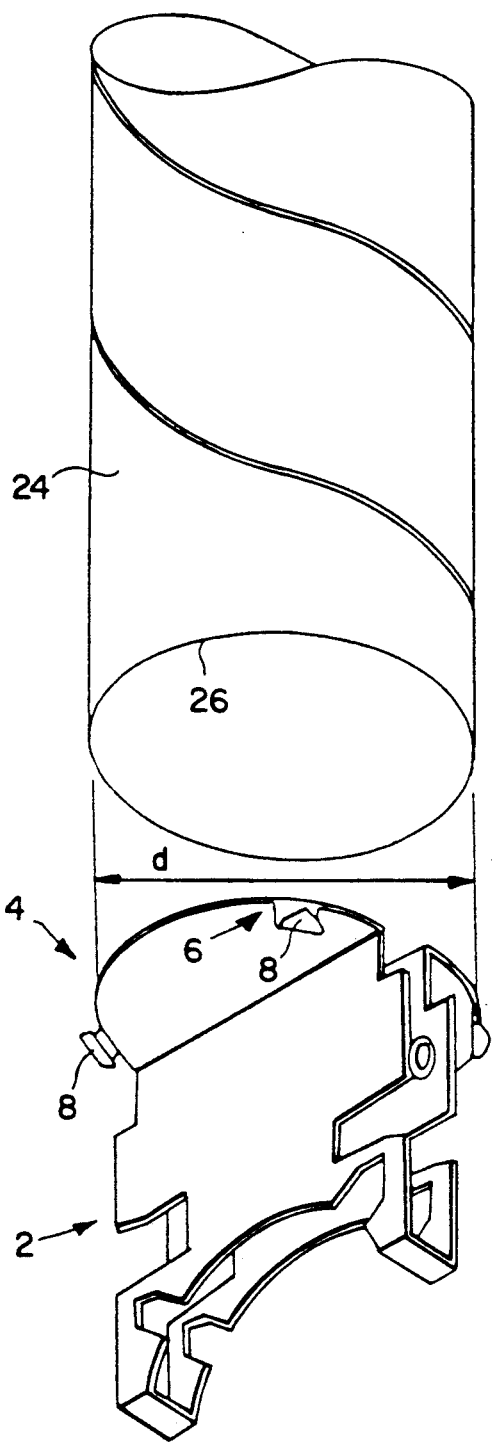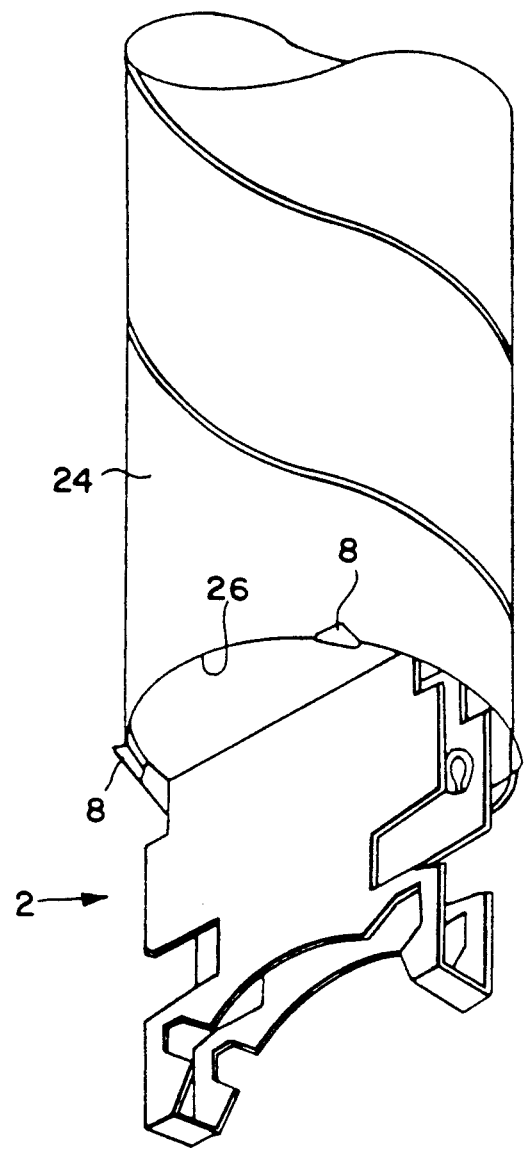

BUILDING STRUCTURES; ELEMENTS AND METHOD FOR CONSTRUCTING SAME

This is a continuation of application Ser. No. 612,580, filed Nov. 12, 1990, now abandoned.

The present invention relates to building construction, and more particularly to a building structure of intersecting hollow tubular structural members, a method of constructing the same, and a wall member and end connector utilized therein.

As a result of the population explosion and the increasingly high cost of housing, there currently exists a housing shortage of increasing proportions. In the recent past, attempts have been made to provide standardized and/or prefabricated building components and housing modules in order to provide cheaper, more easily constructed housing. While many forms of structures have been provided, the assembly of components and erection of the structure have required considerable skill, particularly for those structures intended for or most suited to mass production and widespread utilization. Moreover, most prefabricated building components have taken the form of semi-finished walls, or room or unit modules fabricated in a manufacturing plant and later transported to a building site. Such approaches involve significant transportation problems and associated costs.

It is known to construct building structures of interfitted wall members, particularly logs or timber. See, for example, U.S. Pat. Nos. 3,304,674; 2,473,017 and 2,473,018. The log wall members, however, are generally of substantial weight, while both the log and timber type wall members have required either sophisticated milling and machining operations or extensive manual labor and skill in cutting and shaping the components. Production of such wall members is relatively costly and generally not compatible with on-site fabrication, except for the more unsophisticated, rough log wall members. Erection of such structures has involved considerable time, manpower and materials. Additionally, substantial expense is involved in transporting such materials to the construction site; moreover, log or timber wall members, by their nature, displace a substantial volume, requiring a significant transport capability in moving the components to the building site.

A partial solution to the above problems was provided by U.S. Pat. No. 4,619,089 which disclosed a building structure including a plurality of horizontally disposed hollow tubular structural members. However, the structures built by the method and from the components taught by this disclosure suffered from a serious drawback due, perhaps, to an excessive reliance on the "log cabin" concept, namely, the assumption that the horizontal members had to touch. This concept, transferred to different materials and a different technology, produced two negative results: while with the traditional wooden log cabin at least one of two adjacent logs is worked or molded to provide a wider contact surface essential for good sealing, the contact between two parallel metal tubes is theoretically a line and practically a very narrow strip. This, together with the fact that, due to the spiral seam of these tubes, even that narrow strip is not really continuous, makes sealing very problematic.

The second negative result is due to the fact that, because of inevitable cumulative error, the height of a wall consisting of n contacting tubes of a diameter d is not exactly $n \times d$. As a consequence of this, the connectors at the ends of the tubes do not fully interlock, the joints are less than fully effective and, contrary to what is stated in the patent (column 4, lines 6-12), the vertical load is borne by the tubes rather than by the interlocked connectors.

It is thus an object of the present invention to overcome the drawbacks and disadvantages of the above-mentioned prior-art structures and components and to provide a building structure in which superjacent tubular members do not make contact, but have a clearance between them which, during or after the erection of the structure, can be filled with heat- and sound-insulative material such as rock wool and the like, and in which vertical loads are carried by the connector elements that are fully engaged and thus constitute rigid spines of the structure.

According to the invention, this is achieved by providing an end connector for the joining of one end of a tubular member to one end of at least one other such tubular member having a similar connector, comprising a first portion shaped to fit said tubular member and fixedly attachable to said end; a second, substantially flat portion having two opposite, in assembly upper and lower, edges and extending in the longitudinal direction of said tubular member, said flat portion being disposed, in assembly, in a substantially vertical plane; notch-like recesses, mutually aligned, extending from each of said edges in a direction substantially perpendicular thereto, the width of said notch-like receses being at least equal to the thickness of said second, flat portion at the location of said recesses; wherein, at least at the region of said recesses, the distance between the upper and lower edges of said second portion exceeds the major outside dimension of said tubular member, to the effect that upon assembly of said tubular members and said end connectors, a gap is produced between superjacent tubular members disposed in one and the same plane.

The invention further provides a blank for producing an end connector, comprising, in mirror symmetry about a center line, two end portions of approximately semi-circular shape; a plurality of tabs, integral with said semi-circular end portions and substantially radially projecting therefrom; two intermediate portions each having a first part contiguous with said end portions, of a width substantially equal to the length of the base of said approximately semi-circular end portions, and a second part of a larger width, further comprising a central portion of a width equal to the width of the second part of said intermediate portions, said intermediate portions and said central portion being separated by two pairs of notch-like recesses, each pair consisting of two mutually aligned recesses, each recess having a depth equaling at least one quarter of the width of said central portion and a width at least equaling the thickness of said flat portion of said end connector.

According to another aspect of the invention, there is provided an assembly composed of an end connector inserted into and affixed to a tubular structural member.

The invention still further provides a wall member and a building structure composed of the above end connectors and tubular members.

Another important aspect of the invention provides a method for erecting a building structure having at least one pair of walls, comprising the steps of: providing a plurality of wall members, complete with a sleeve-like covering for said tubular members, consisting of thermal insulation means; providing first and second foundations for said at least one pair of walls constituting said building structure; placing a first wall member of the first wall of said pair of walls complete with said end connector on said first foundation; placing a first wall member of the second wall of said pair of walls complete with said end connector on said second foundation, with its end connector being with its end connector being engaged and retained by the end connector of the first wall member of said first wall; placing a second wall member of said first wall onto the first wall member thereof, with its end connector being engaged and retained by the connector means of the first wall member of said second wall; placing a second wall member of said second wall onto the first wall member thereof, with its end connector being engaged and retained by the connector means of the second wall member of said first wall; placing an nth wall member of said first wall onto the (n−1)th wall member thereof, with its end connector being engaged and retained by the connector means of the (n−1)th wall member of said second wall, and placing an nth wall member of said second wall onto the (n−1)th member thereof, with its end connector being engaged and retained by the end connector of the nth wall member of said first wall.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

IN THE DRAWINGS

FIG. 3 shows the end connector being introduced into the tubular structural member;

FIG. 4 shows the end connector seated inside the tubular member, with the ends of the tabs peened over to secure the end connector;

Figure 1:
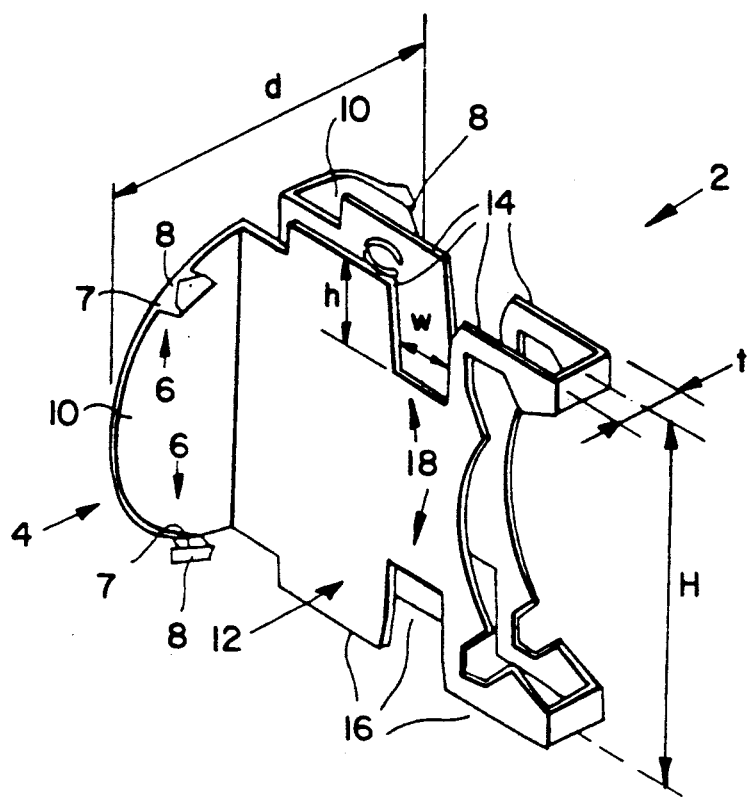
FIG. 1 is a perspective view of an end connector according to the invention.

Referring now to the drawings, there is seen an end connector 2 according to the invention, advantageously made of a sheet-metal stamping, which comprises a first portion 4 shaped to fit into a tubular structural member to be discussed further below and provided with bent tabs 6 which define the depth of introduction of the first portion 4 into the tubular member, and then, by peening over, or crimping the pointed tips 8, effect the fixed and secure attachment of the end connector 2 to that member. The first portion 4 is comprised of two nearly semi-circular flaps 10, the common outline of which is a circle of a diameter substantially equal to the inside diameter d of the above tubular member, seen in FIGS. 3 and 4.

Further seen is a second, basically flat portion 12 which, in assembly, has opposite upper and lower edges 14 and 16, respectively. In assembly, the surfaces of this second portion 12 are disposed in vertical planes. The width of the second portion, i.e., the lower-to-upper-edge distance H is substantially larger than the outside diameter D of the above-mentioned tubular member, as is particularly clear from FIG. 5. The importance of this characteristic will be explained further below.

Figure 5:
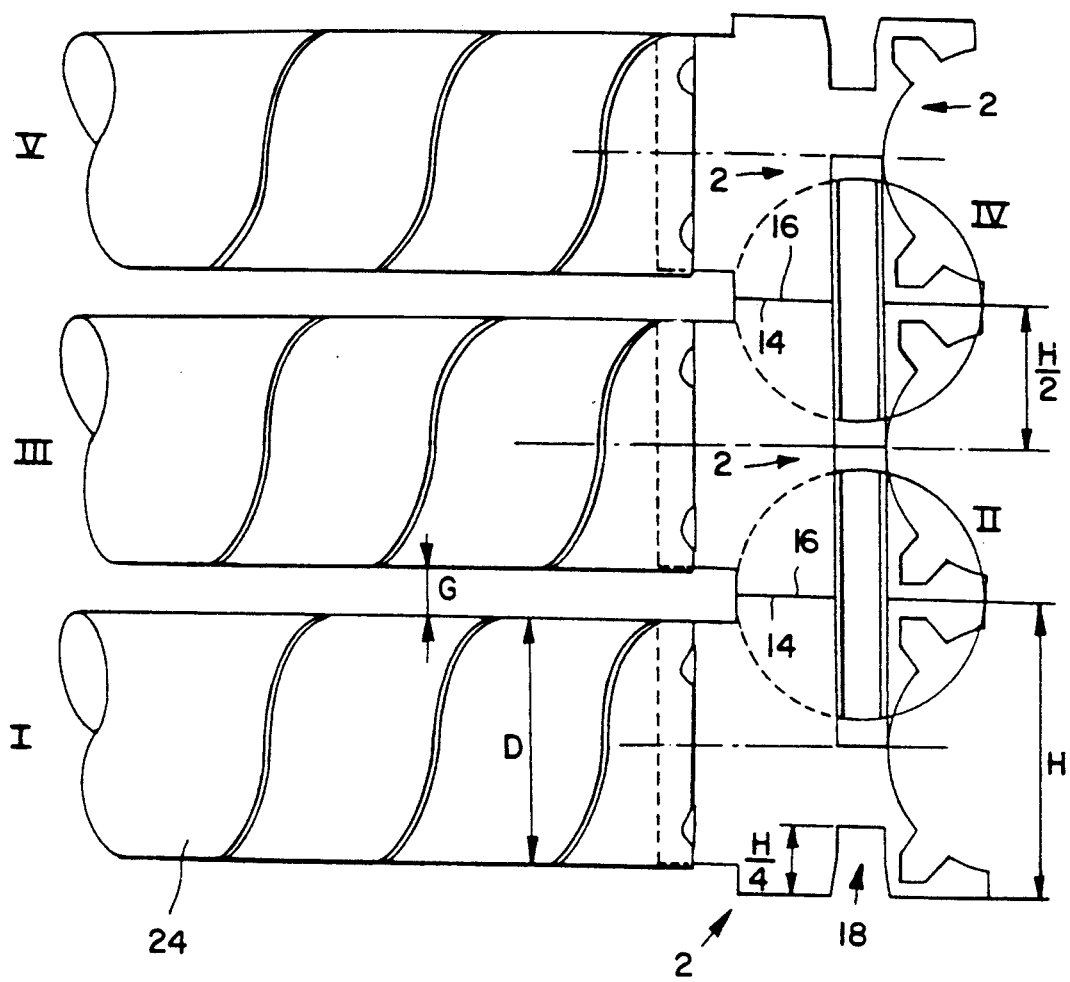
FIG. 5 is an elevational view of a corner section of a structure according to the invention.
Figure 6:
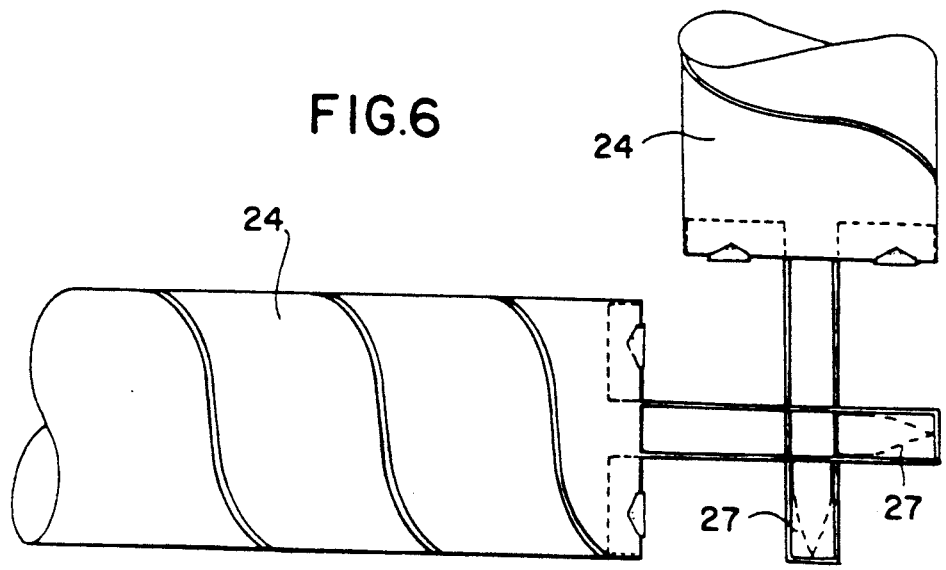
FIG. 6 represents a top view of the structure of FIG. 5.
Figure 7:
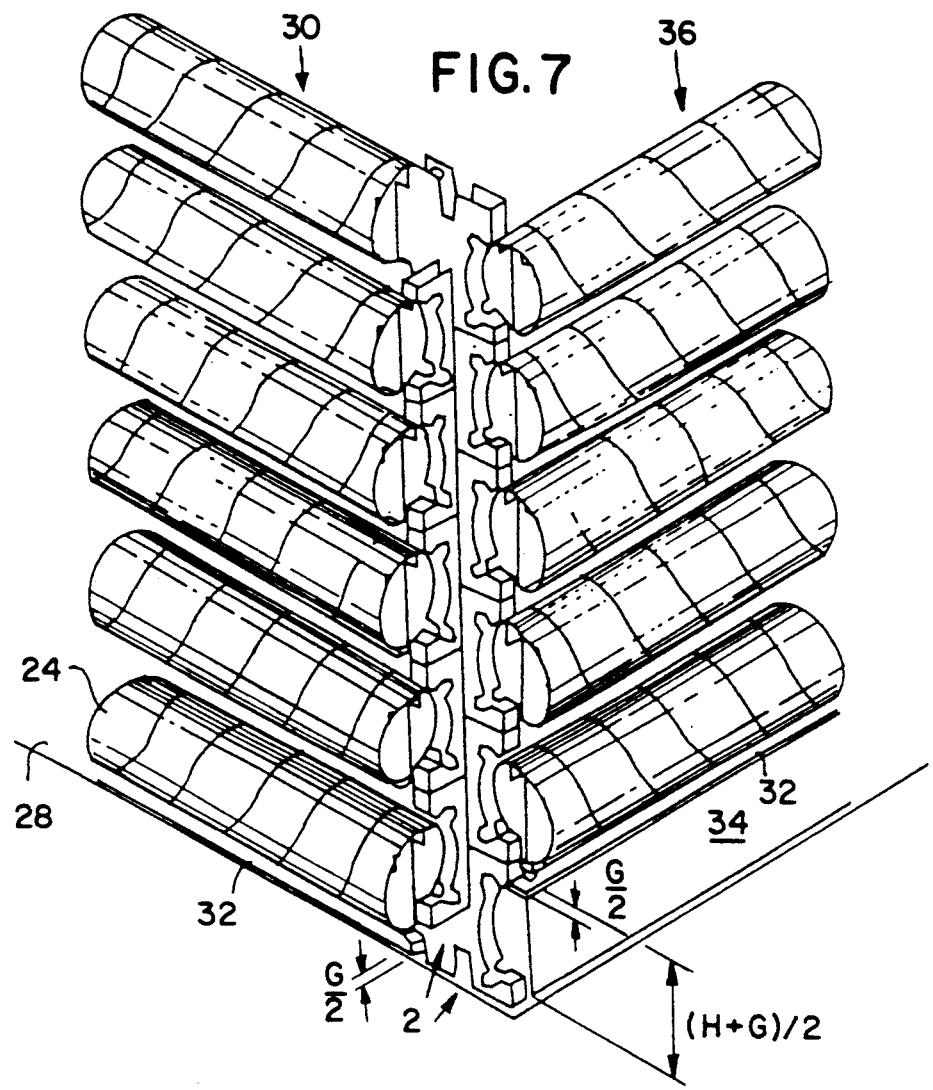
FIG. 7 is a perspective view of the corner section of FIG. 6, showing also the foundation support members, and FIGS. 8a-d schematically illustrate different ways to apply thermal insulation to the structures according to the invention.

Further provided are two pairs of mutually aligned notch-like recesses 18, the width w of which is at least equal to the thickness t of the second portion 12. The depth h of the notch-like recesses is at least H/4 which, as emerges from FIG. 5, is important for full, load-carrying contact between the end connectors at the corners of the wall structures, which end connectors, interlocking as seen in FIGS. 5, 6 and 7, form at each corner a rigid "spine" that supports the entire structure.

It is furthermore seen that the edges 14 and 16 do not extend right up to the semi-circular flaps 10, but step down a short distance in front of the flaps. This is of course necessary because the first portion 4 is seated some distance inside the tubular member, which would be impossible if the edges 14, 16, the distance H between which is larger than the diameter d, were to extend as far as the portion 4.

Figure 2:
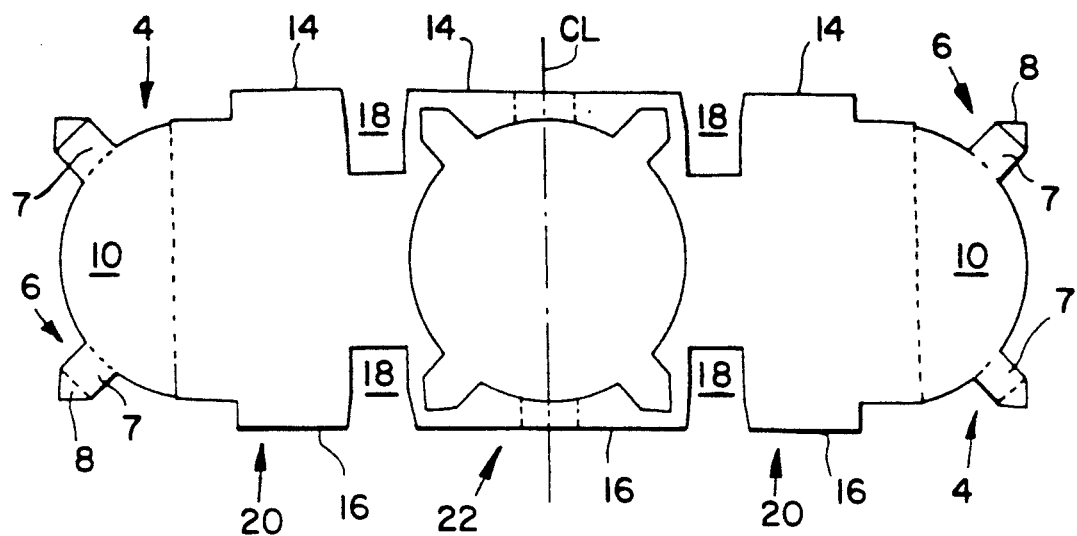
FIG. 2 represents the sheet-metal blank from which the end connector of FIG. 1 is formed.

FIG. 2 represents the blank from which the end connector 2 of FIG. 1 is formed. The blank is mirror-symmetrical about the center line CL and there are seen the two end or first portions 4 comprised of the approximately semi-circular flaps 10 (which, strictly speaking, are segments of circles) and the tabs 6 including a first part 7 and a second part, advantageously in the form of pointed ends 8.

Further seen are two intermediate portions 20 contiguous with the first portions 4. The larger part of these portions is of a width equal to H of FIG. 1, and provides part of the edges 14, 16, while another part is stepped down to a width substantially equal to the bases of the flaps 10.

Also shown is a central portion 22 of a width equal to H and furnishing part of the edges 14, 16.

The central portions 22 and the intermediate portions 20 are separated by the two pairs of notch-like recesses 18, each pair consisting of two mutually aligned recesses, the dimensions of which were indicated in conjunction with FIG. 1. It will be noted that at their entrance, the recesses 18 are slightly flared, to facilitate mutual introduction of the end connectors during assembly of the structures.

Setting out from this blank, the end connector 2 is produced by bending along the broken lines.

FIG. 3 shows an end connector according to the invention being introduced into a tubular structural member. The tubular member 24 is seen to be of a circular cross-section with an internal diameter d, which is also the external diameter of the end portion 4 of the connector 2. The tubular member is also seen to be made of a wound sheet-metal strip, a known and relatively inexpensive method for producing thin-walled metal tubes of any length.

The end connector 2 is pushed into the tubular member as far as it will go, that is, until the bent-over tips 8 of the tabs 6 are seated on the edge 26 of the tubular member 24. This is the situation as illustrated in FIG. 4. What remains to be done now is to strongly press the tips 8 against the tubular member, which can be done by peening, crimping, or by the use of a simple plier.

The corner section of FIG. 5 clearly shows the way in which the end connectors 2 of the wall members I, III, V engage and interlock with the wall members II and IV (the wall member being defined as a tubular member 24 complete with end connector 2): the lower recess 18 (not shown) of the wall member II interlocks with the upper recess 18 (not shown) of the wall member I; the upper recess 18 of the wall member II interlocks with the lower recess of the wall member III, and so on.

From FIG. 5 it is also clear that the lower edge 16 of each end connector 2 rests on the upper edge 14 of each subjacent end connector 2, thus transferring the load to the ground and turning the plurality of superjacent, interlocked end connectors of each such corner into a rigid spine.

FIG. 5 also clearly illustrates the effect of the above-mentioned fact, characteristic of the present invention, that the width H of the end connector 2 is substantially larger than the outside diameter D of the tubular member 24, namely the gap G, the size of which is (H−D). The center distance between superjacent wall members of one and the same wall is thus H, while the center distance between a wall member of one wall and the next higher (or lower) wall member of the other wall is H/2.

The broken lines 27 in FIG. 6 indicate a variant of the end connector 2, in which the center line CL in FIG. 2 serves also as bending line of the blank, instead of the two bending lines on either side of the center line CL.

FIG. 7 is a perspective view of the corner section of FIG. 5, giving also some indication as to the erection method. There is provided a smooth, plane and horizontal base surface 28, advantageously made of concrete with a cement mortar rendering. Onto this surface is placed a foundation 32 for the first wall 30, in the form of a strip made of, e.g., synthetic rubber or the like, of a thickness equaling G/2 and extending over the entire length of the lowermost tubular member 24 of the first wall (but not below the end connector 2). On a pre-prepared raised edge 34 of a height (H+G)/2 is now placed a similar strip 32, after which the erection of the walls begins.

The lowermost wall member of the first wall 30 having been placed, the lowermost wall member of the second wall 36 is put in place, with its end connector 2 interlocking with the end connector 2 of the lowermost wall member of the first wall.

The next step would be the application of a layer of the insulating material as mentioned above, and as explained in greater detail in conjunction with FIGS. 8a–d. Then, the second wall member of the first wall is placed, interlocking with the end connector 2 of the lowermost wall member of the second wall. In this way the walls are built up, the end connector 2 of each wall member being received by, and interlocking with, the end connector of the next-lower wall member of the other wall. The layer of insulation, according to one method, is applied before the placing of the next-higher wall member of one and the same wall.

FIGS. 8a–d illustrate some ways to apply insulation material 38 to fill and seal the gaps and also to at least partly envelop the tubular members. There exist a number of relatively inexpensive materials that could serve for this purpose, such as rock wool in the form of mats lined on both sides with weather-resistant plastics, or the like. The illustrations are schematic only, with the insulation sheets or mats 38 indicated by dash-dotted lines. The thickness of the mats 38 is clearly a function of the size of the gap G. Obviously, in the embodiments 8c and 8d, where the gap G accommodates two layers, the mats 38 will be of about half the thickness.

Figure 8A:
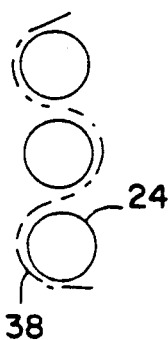
Figure 8B:
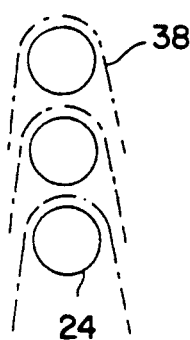
Figure 8C:
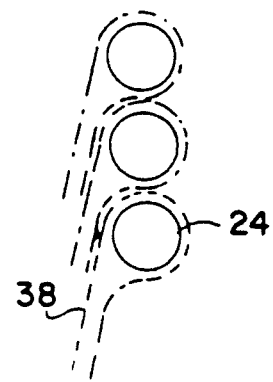

In FIG. 8a, a sheet or mat 38 is seen to wind or meander through the gaps G, while in FIG. 8b wide strips of the insulation material cover the tubular members on both sides, overlapping like shingles.

Another shingle effect is provided by the embodiment of 8c, in which the angle of wrap-around is larger and the overlap exists on one side only.

Figure 8D:
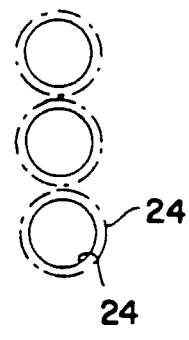

The insulation as shown in FIG. 8d is sleeve-like and, in accordance with a second method, is advantageously applied not during, but prior to, the erection of the structure. Strips of appropriate width are wrapped around the tubular members 24 and may be fixedly attached thereto either by adhesive bonding or by means of straps or clips.

While the end connectors 2 shown are made from sheet-metal stampings or blanks, they may also be produced by other methods such as, e.g., die casting or injection molding.

The tubular members 24 may also be produced by metal or plastic extrusion or, for some light-duty applications, also from paper board, and may also have other than circular cross-sections.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A tubular wall member assembly comprising an end connector, said end connector providing a flat, substantially circular front end portion and a rearward body portion comprising a two spaced, matchingly notched, parallel plates, a plurality of tabs extending rearwardly from the periphery of said circular front end portion towards said rearward body portion, each of said tabs including a first flat part and a second flat part, said second flat part being bent outwardly from said first flat part of said tab, a length of an open-ended hollow tubular structural member, said front end portion of said connector being inserted into an open end of said tubular member for a distance substantially corresponding to the length of said first flat part of said tabs so that said second flat part of said tabs where bent from said first flat part contacts the end of said tubular member, the spaced plates of said rearward body portion of said end connector being positioned outside of the open end of said tubular structural member into which the front end portion of said end connector is inserted and said spaced plates having a width larger than said open-ended tubular member into which said front portion is inserted whereby said tubular wall member assembly including said tubular structural member and said end connector inserted into and fixed to said tubular member provides a gap when one said wall member assembly is superposed and placed super-jacent on top of another.

2. A tubular member assembly in accordance with claim 1 wherein said open-ended hollow tubular structural member is of substantially circular cross section and is made of spirally wound strip steel.

3. A tubular wall member assembly in accordance with claim 1 wherein said tubular hollow structural member is provided with a thermal insulating coating on the outside thereof.

4. A plurality of tubular wall member assemblies in accordance with claim 1 arrayed to form a wall wherein said plurality of wall member assemblies making up said wall are disposed superposed and super-jacent one above the other.

* * * * *